United States Patent
Irle et al.

(10) Patent No.: US 7,813,461 B2
(45) Date of Patent: Oct. 12, 2010

(54) SENSOR, MORE SPECIFICALLY A POSITION SENSOR, FOR A VEHICLE WITH SEVERAL ON-BOARD MEASURING SYSTEMS WORKING INDEPENDENTLY FROM ONE ANOTHER

(75) Inventors: Henning Irle, Lippstadt (DE); Franz-Josef Schmidt, Salzkotten (DE)

(73) Assignee: Hella KGaA, Lippstadt (DE)

( * ) Notice: Subject to any disclaimer, the term of this patent is extended or adjusted under 35 U.S.C. 154(b) by 889 days.

(21) Appl. No.: 11/629,645

(22) PCT Filed: Jun. 8, 2005

(86) PCT No.: PCT/EP2005/052626

§ 371 (c)(1),
(2), (4) Date: Dec. 15, 2006

(87) PCT Pub. No.: WO2006/000524

PCT Pub. Date: Jan. 5, 2006

(65) Prior Publication Data

US 2008/0273587 A1    Nov. 6, 2008

(30) Foreign Application Priority Data

Jun. 25, 2004    (DE) .................. 10 2004 030 700

(51) Int. Cl.
*H04L 25/00* (2006.01)
(52) U.S. Cl. .................................... 375/371
(58) Field of Classification Search .............. 375/371,
375/238; 702/150; 324/676, 207.25, 207.17;
318/466; 327/50–52; 73/114.01
See application file for complete search history.

(56) References Cited

U.S. PATENT DOCUMENTS

| 4,227,181 | A |   | 10/1980 | Brittain |
| 6,144,229 | A | * | 11/2000 | Blossfeld ..................... 327/50 |
| 6,467,338 | B1 | * | 10/2002 | Irle et al. .................. 73/114.01 |
| 6,480,805 | B1 | * | 11/2002 | Irle et al. .................... 702/150 |

FOREIGN PATENT DOCUMENTS

| DE | 198 22 146 A1 | 5/1998 |
| DE | 100 49 090 A1 | 9/2000 |
| DE | 100 46 584 A1 | 4/2002 |
| EP | 1 081 453 A1 | 3/2001 |
| EP | 1 255 371 A1 | 4/2004 |

OTHER PUBLICATIONS

PCT International Search Report PCT/EP2005/052626 filed Aug. 6, 2005.
German Search Report 10 2004 030 700 filed Oct. 2, 2005.
XP 000071968—Baseband transmit and receive processors for two-channel PWM telemetry, N.E. Evans, Medical & Biological Engg. and Computing, Mar. 27, 2989, p. 215-220.

* cited by examiner

*Primary Examiner*—Khai Tran
(74) *Attorney, Agent, or Firm*—Robert C. Haldiman, Esq.; Husch Blackwell LLP

(57) ABSTRACT

The invention presented herein describes a sensor, more specifically a position sensor for a vehicle, featuring several measuring systems that work independently of one another, where each of the measuring systems generates a pulse width-modulated signal becoming available at an output of the sensor one by one, where each of the sensor values is coded according to the duty factor of a pulse compared with the period of the signals, and where the sensor has means of synchronizing the sensor with a receiving station, wherein the means of synchronization is used to modify the amplitude and/or the period of one or several pulses.

10 Claims, 2 Drawing Sheets

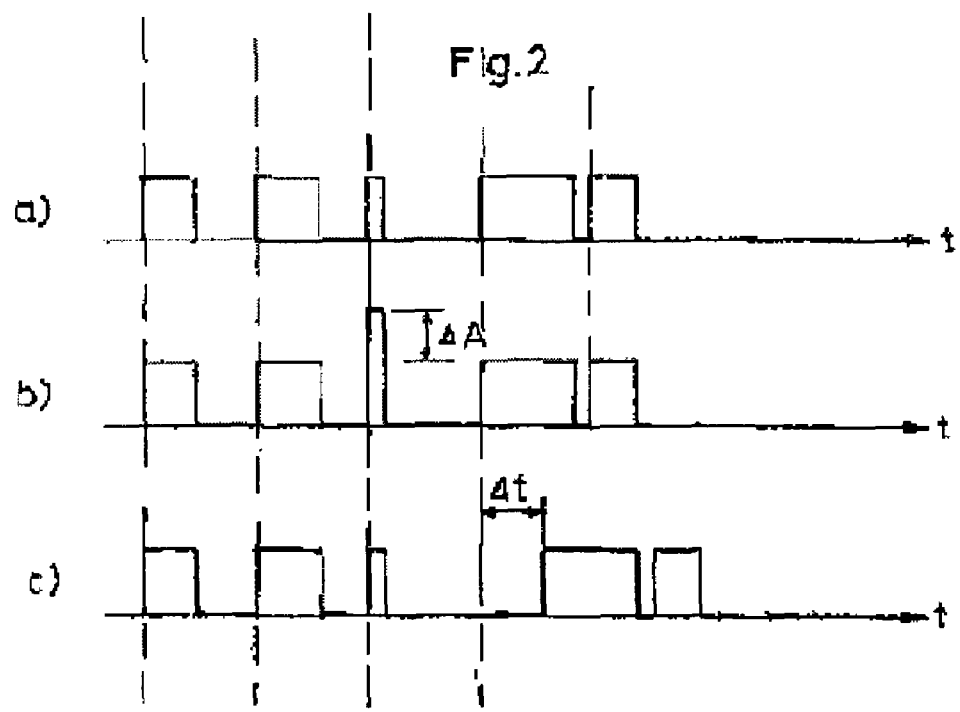

SENSOR, MORE SPECIFICALLY A POSITION SENSOR, FOR A VEHICLE WITH SEVERAL ON-BOARD MEASURING SYSTEMS WORKING INDEPENDENTLY FROM ONE ANOTHER

CROSS-REFERENCE TO RELATED APPLICATIONS

This application claims priority from International Application No. PCT/EP/2005/052656 filed Jun. 8, 2005 which claims priority from German Patent Application No. 10 2004 030 700 filed Jun. 25, 2004.

The subject matter of the invention is a sensor, more specifically a position sensor, for motor vehicles with several on-board measuring systems working independently from one another, each of which produces a pulse width-modulated signal output to a sensor output one after the other, where sensor values are coded as the ratio of a pulse and the period of the signals, and where the sensor has means of synchronizing the sensor with a receiver.

STATE OF THE ART

A sensor of this kind is described in publication EP 1 081 453 B1. The aforesaid publication reveals a sensor featuring a first output, that is to say a signal output, and a second output, that is to say a control output. This control output makes synchronization signals available which a receiver could use, for example, to determine the order of signals transferred or the start of a series of signals if the order of signals in that series of signals is known to the receiver. The aforementioned publication also describes a sensor which transfers the synchronization signal via the same output that is used to pick up the signals from. The publication does not detail the technical implementation of the idea.

However, a method of synchronizing the sensor and a receiver using the same output that is also taken to transfer the signals would benefit from the sensor generally being of a much simpler design and from the fact that no second line would be needed between the sensor and the receiver.

ADVANTAGES OF THE INVENTION

The purpose of the invention is to suggest a sensor of the aforementioned type, where the sensor just has a single signal output and a synchronization signal.

The invention serves this purpose by using the means of synchronization to manipulate the amplitude and/or the period of one or several pulses. Since the sensor value is coded according to the signal pulse-duty factor, the period and the amplitude can be changed without affecting the actual signal. Where the period is concerned, there is still the constraint that a set period is otherwise used and that this set period is known to the receiving station. The receiving station can change the period to find out whether or not a signal is a synchronization signal which may, however, also contain the coded sensor value. The amplitude is the other element that can be changed without affecting the coded sensor value transferred with the signal. Again the signal may carry a sensor value with the aim of obtaining a synchronization signal for synchronizing the receiving station and the sensor.

A sensor, according to the invention presented herein, can also feature a control element which allows the sensor to set the order or signals available at the output one after the other. The set order of signals is preferably known to the receiving station. In that case, the synchronization signal marks the beginning of a series of sensor values to be transferred. It is also possible to use the synchronization signal for separately labeling any signal provided by the sensor to be able to get separate addresses for every signal. By referencing the signal address, a receiving station can decide which sensor signal(s) is/are relevant to that station. In that case it is not necessary to count the signals starting from a single synchronization signal. Another benefit is that the order of synchronization signals need not be known by the receiving stations.

A sensor, according to the invention presented herein, can also provide a means of generating a reference signal which, if it is available, can be picked up from the sensor output. The reference signal is added at a set point within the sequence of sensor values. The control element ensures that this process works properly. One of the uses of a reference signal could be to check the property or quality of a transfer line. If all the properties of a reference signal are known to the receiving station, the receiving station can match the signal received with a set reference signal to assess the quality of a transfer line by looking at the differences between the two. Another possible use of a reference signal could be to compensate error sources which may be caused by switching thresholds in the receiving station when pulse edges are trapezoidal.

A sensor, according to the invention presented herein, may also contain means of inverting one or several signals. The means of inverting signals could provide an inverted signal at the sensor output where it would be available after either one or several of the signals. The control element could be one of the means by which the process could be ensured to work properly. Another option would be to make an inverted signal available at the output after every signal. Such type of inverted signals and the method of alternating between inverted and non-inverted signals may compensate for negative influences, such as a receiver's switching thresholds. If installed in a sensor according to the invention presented herein, the control element can also be taken to manipulate the period of a signal with reference to the resolution required of every signal.

DRAWINGS

The drawings further explain the invention where

FIG. 2 shows the signals over time that can be picked up from the outputs of sensors, according to the invention

EXPLANATION OF DESIGN EXAMPLE

Figure 1:
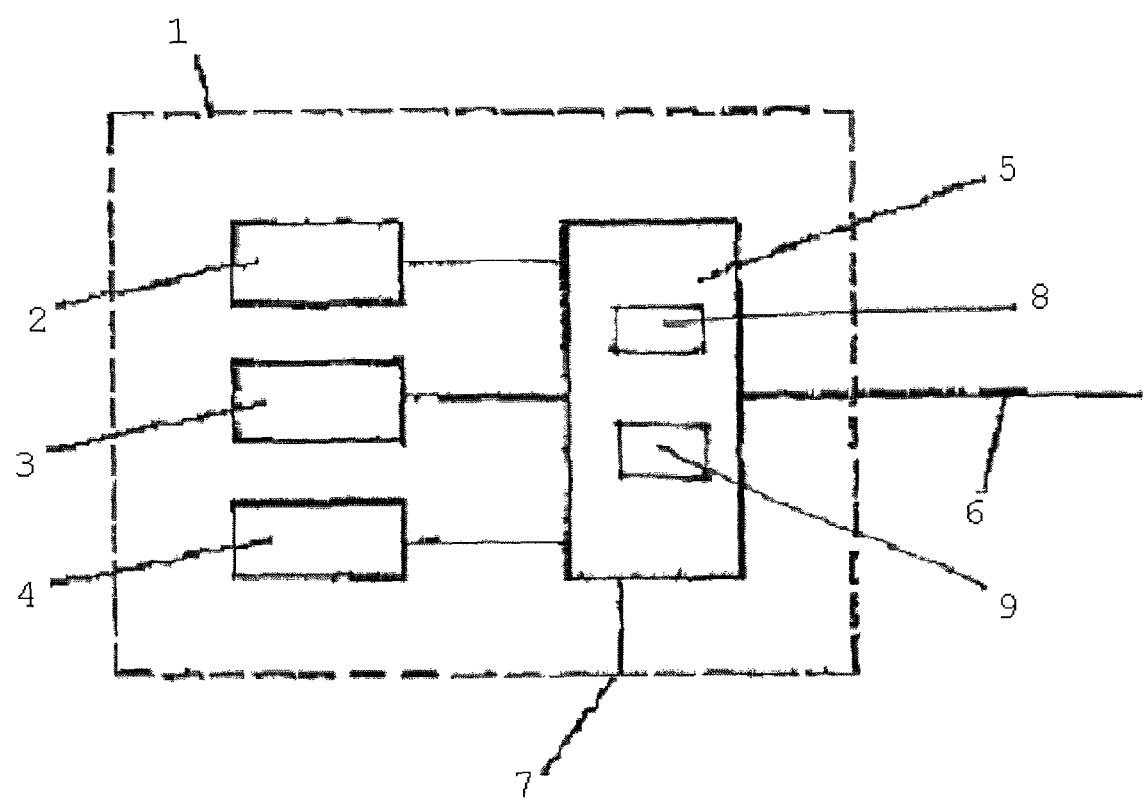
FIG. 1 shows the block diagram of a sensor, according to the invention

FIG. 1 shows a sensor according to the invention presented herein. It features measuring systems [2, 3, 4] working independently from one another to register different positions picked up from the output [6] of the sensor [1]. The sensor values picked up by the measuring systems [2, 3, 4] are sent to an ASIC [5] which turns the sensor values into pulse width coded signals. These signals are made available via the output [6] of the sensor [1] in an order set by the ASIC [5]. A connector [7] supplies electrical operating voltage to the ASIC [5] and the measuring systems. The sensor values supplied by the measuring systems [2, 3, 4] to the ASIC [5] are pulse width-modulated so that the pulse=duty factor of a "high" or "low" signal level and the period is equivalent to the sensor value. The amplitude and, with restrictions, the period have no effect on the coding of sensor values and/or the readings of sensor values. An inverter [8] for inverting the signal and a signal generator [9] for generating the referenced signal may be an integral part of the application specific integrated circuit [5].

The signals representing the sensor values delivered by the measuring systems [2, 3, 4] are sent to the output [6] of the sensor [1] in a set order which is known to a receiving station. To ensure that the receiving station and the sensor are synchronized, i.e. to ensure that the receiving station knows which signal has been transferred last or is being transferred, the sensor has a means of synchronization. This means of synchronization is an integral part of the ASIC. To synchronize, the means of synchronization modifies the amplitude and/or the period of one or several pulses or signals. Since the pulse-duty factor is used for coding, the period and the amplitude of a signal can be changed without affecting the information carried by the actual signal. Such modification of the amplitude or the period can be used to transfer a synchronization signal to the receiving station. A higher or lower amplitude of the pulse or a longer period are able, for example, to tell the receiving station which signal is the first in a series of signals. Starting with this first signal, the receiving station needs only to count to know which signal is currently available at the output [6] of the sensor. FIG. 2a plots a signal over time which does not contain a synchronization signal. The variation in time shown in FIG. 2b synchronizes the devices by increasing the amplitude by the amount of $\Delta A$. The variation in time shown in FIG. 2c has a longer period of the third signal in the curve. The period is increased by time $\Delta t$ and, by the larger gap between rising edges, the receiving station can tell that this is the synchronization signal.

What is claimed is:

1. A sensor, more specifically a position sensor for a vehicle, comprising:
   at least two measuring systems that work independently of one another, where each of the measuring systems generates a pulse width-modulated signal becoming available at an output of the sensor one by one;
   where a sensor value is coded according to a duty factor of a pulse compared with a period of the signal, and where the sensor synchronizes with a receiving station, wherein the synchronization is the modification of one of an amplitude or a period of at least one pulse.

2. The sensor, as in claim 1, wherein the sensor further comprises a control element for setting an order in which a series of single signals are made available at the output of the sensor.

3. The sensor, as in claim 1, wherein the sensor further comprises a reference signal generator.

4. The sensor as in claim 3, wherein a control element ensures that a reference signal becomes available at the output of the sensor at least one set point within a series of signals.

5. The sensor, as in claim 1, wherein the sensor includes an inverter, said inverter inverting one of several signals.

6. The sensor, as in claim 5, wherein a control element ensures that the inverted signal generated by the inverter becomes available at the output of the sensor after at least one of the signals.

7. The sensor as in claim 6, wherein the control element ensures that the inverted signal becomes available at the output of the sensor after every single signal.

8. The sensor, as in claim 1, wherein the sensor includes an integrated circuit, and wherein a synchronization element, a control element, a reference signal generator, and/or an inverter are an integral part of the integrated circuit.

9. The sensor, as in claim 8, wherein the integrated circuit is an ASIC.

10. The sensor, as in claim 1 further comprising at least one receiving station that further processes the signals received from the sensor, wherein the synchronization modifies the amplitude and/or the period of at least one pulse and wherein the receiving station receives this modification as a synchronization signal.

* * * * *